Oct. 20, 1936.    A. BOLTON    2,057,761
FRICTION CLUTCH
Filed Oct. 29, 1935    2 Sheets-Sheet 1
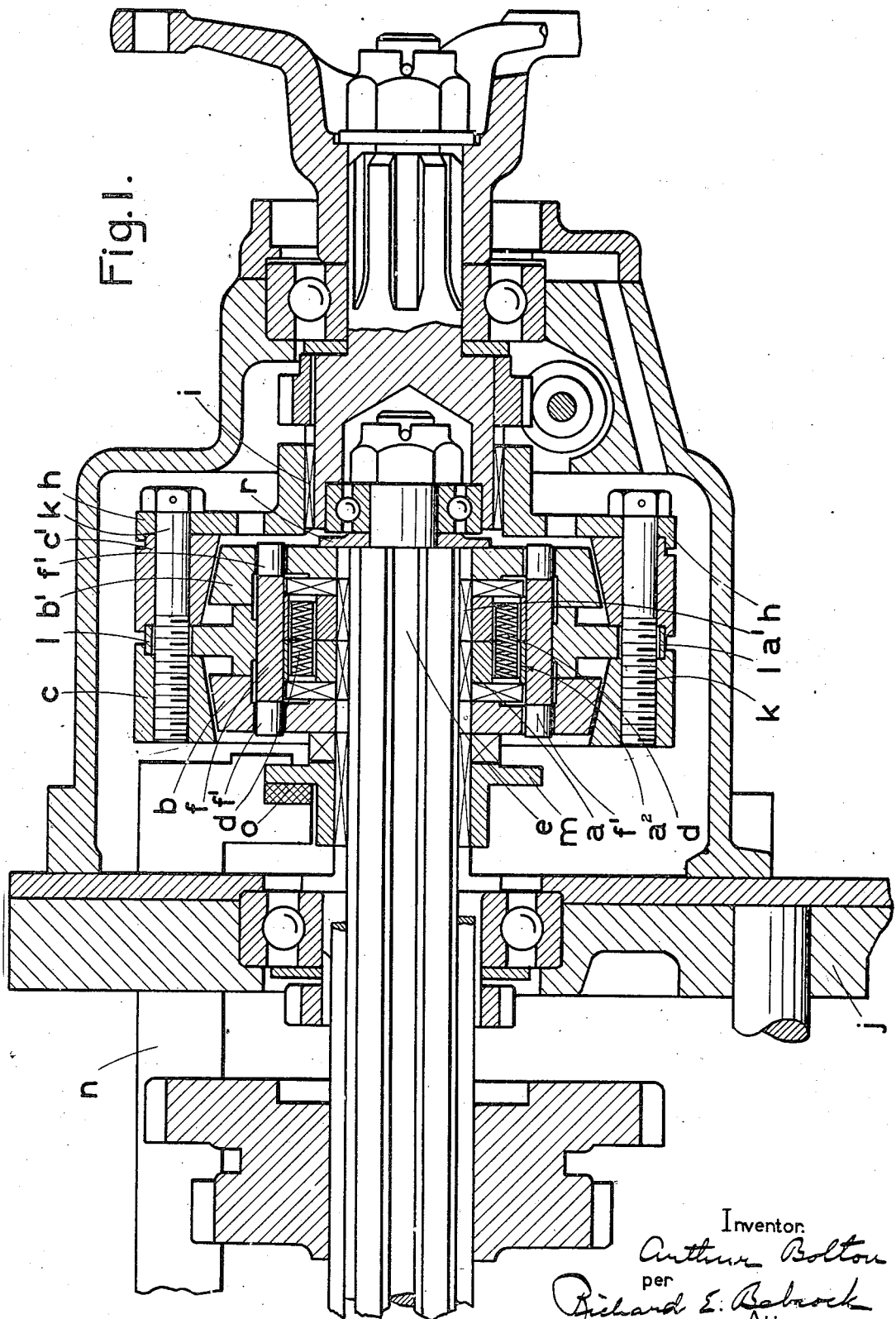
Inventor:
Arthur Bolton
per
Richard E. Babcock
Attorney.

Oct. 20, 1936.  A. BOLTON  2,057,761
FRICTION CLUTCH
Filed Oct. 29, 1935   2 Sheets-Sheet 2
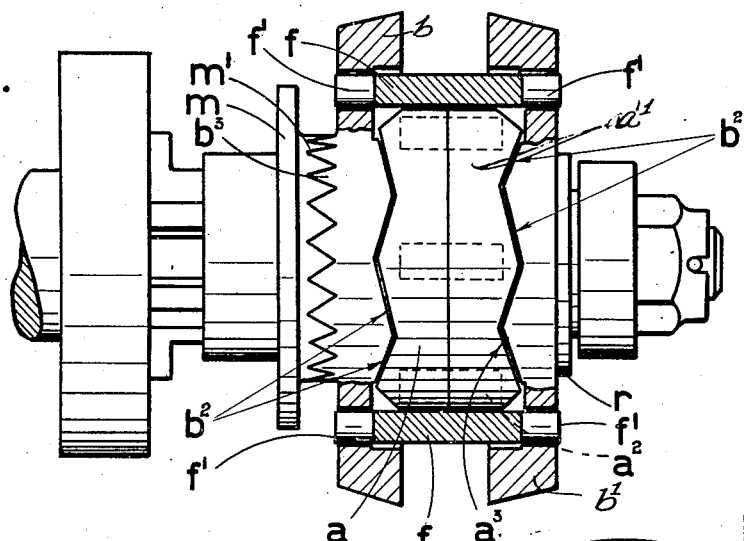
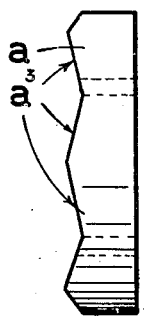
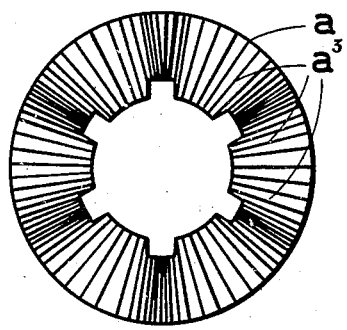
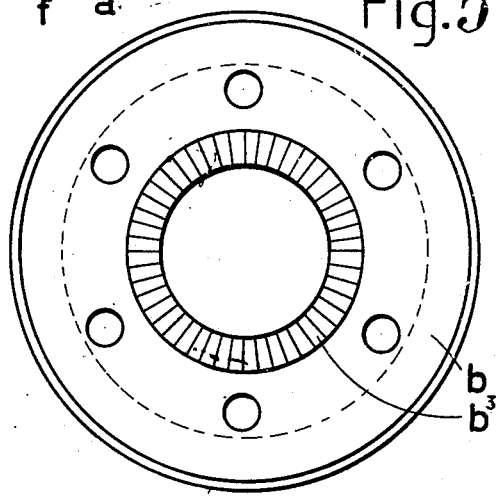
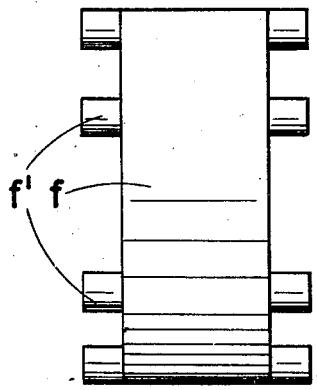
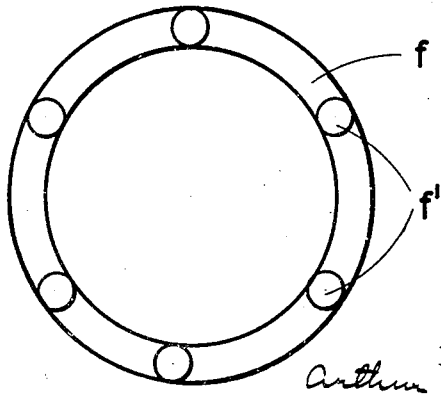

Patented Oct. 20, 1936

2,057,761

UNITED STATES PATENT OFFICE 2,057,761

FRICTION CLUTCH

Arthur Bolton, Coventry, England

Application October 29, 1935, Serial No. 47,327
In Great Britain October 30, 1934

2 Claims. (Cl. 192—54)

This invention relates to friction clutches of the kind in which the pressure between the friction surfaces increases automatically with the transmitted torque in either direction, and more particularly to the kind in which the movable member of the clutch is moved into frictional engagement with its complementary member by the co-action between the inclined surfaces of V-section projections on the adjacent faces of said movable member and a driving member on the driving shaft.

The object of this invention is to improve the efficiency and to facilitate the control of a clutch of the kind referred to.

According to the present invention the clutch members are duplicated, the movable members being mounted loosely on the driving shaft at opposite sides of the driving member, whilst the complementary clutch members are connected together and slidably mounted on the splined end of the driven shaft.

The improved clutch is characterized in that there is associated with one of the movable clutch members and a clutch operating collar slidably mounted on the splined end of the driving shaft, means whereby, when the clutch operating collar is moved in a direction to allow the clutch to operate, the movable clutch members are free to turn to a limited extent in either direction on the driving shaft relatively to and under the action of the driving members, and whereby, when the clutch operating collar is moved in a direction to disengage the clutch the movable clutch members are restored to their inoperative angular positions with respect to the driving members.

In the accompanying drawings,

Figure 1 is a longitudinal sectional view of the improved clutch and the adjacent ends of the driving and driven shafts.

Figure 2 is a view partly in section of the internal members of the clutch and its disengaging collar.

Figures 3 and 4 are side and face views respectively of one element of the divided driving member of the clutch.

Figure 5 is a view of the outer face of one of the driven members or cones of the clutch.

Figures 6 and 7 are side and face views respectively of a dowel ring for equalizing the angular movements of the driven cones.

Throughout the drawings like parts are designated by similar reference characters.

Referring to the drawings, $a$, $a^1$ represent the driving members of the clutch, $b$, $b^1$ the driven members or cones and $c$, $c^1$ the driven rings or complementary members of the clutch.

The adjacent faces of the driving members are recessed at $a^2$ to receive compression springs $d$ tending to force the two parts away from each other along the splined end $e$ of the driving shaft.

The outer faces of the driving members are each formed with an annular series of radially arranged V-shaped projections or cam surfaces $a^3$ adapted to co-act with similar cam surfaces $b^2$ on the adjacent inside faces of the driven members or cones $b$, $b^1$ which are free to rotate upon the end of the driving shaft and are arranged at the outer sides of the driving members $a$, $a^1$. The said cones are connected with each other by means of dowel pins $f^1$ projecting from each face of a ring $f$ which is loosely mounted on the driving members between the movable clutch members $b$, $b^1$ to ensure said members moving in unison with each other and is shown separately in Figures 6 and 7.

The driven rings or complementary members $c$, $c^1$ of the clutch are bolted to a flange $h$ which is free to slide upon the splined end $i$ of the driven shaft but is rotatable therewith. The said rings and their connecting bolts $k$ are supported by means of a plate $l$ rotatably mounted upon the dowel ring $f$. The axial movement of the cones $b$, $b^1$ in the direction of disengagement from the driven rings $c$, $c^1$ is limited by the clearance provided between the driving members $a$, $a^1$.

The clutch is operated by means of a collar $m$ slidably mounted on the splined end $e$ of the driving shaft. The adjacent faces of this collar and of the movable clutch member $b$ are each provided with an annular series of radial teeth $m^1$, $b^3$ of V-section and preferably of a smaller pitch and sharper angle than those of the cam surfaces $a^3$, $b^2$ on the driving members and movable clutch members.

The arrangement is such that when the clutch operating collar is released to allow the clutch to become operative sufficient clearance is left between the teeth $m^1$, $b^3$ to allow for a slight angular movement of the movable clutch members $b$, $b^1$ consequent upon the co-action between the cam surfaces $a^3$, $b^2$ on the driving members and the movable clutch members. Conversely, when the clutch operating collar is moved against the movable clutch member $b$ to release the clutch the co-action of the said teeth thereon causes the said movable clutch members to be restored to their inoperative angular positions with respect to the driving members. This arrangement also provides a gradual engagement and disengagement thus avoiding shock.

During the initial movement of the clutch operating collar in a direction to allow the clutch to operate, the movable clutch members are first moved into frictional engagement with their complementary members $c$, $c^1$ with a predetermined pressure under the influence of the springs $d$ aforesaid, between the driving members $a$, $a^1$, further engagement of the clutch being controlled by the action of the teeth $m^1$ and $b^3$ which prevent the cones $b$, $b^1$ jumping into their self-energizing positions with respect to the driving members $a$, $a^1$.

When the improved clutch is employed in the transmission gear of motor vehicles it is arranged, as shown, at the rear of the gear box $j$ and the striking fork $n$ for the clutch operating collar is connected with the pedal operating the existing friction clutch hereinafter referred to as the main clutch at the front of the gear box in such a manner that the drive is first interrupted by the main clutch so that the improved clutch is disengaged under zero load conditions. When the pedal is released to let in the main clutch the improved clutch engages first, thus speeding up the gear box shafts and the spinning member of the main clutch, after which the latter engages and brings the engine speed into agreement with the car speed corresponding with the gear which has been engaged. When the clutch pedal is depressed to release the main clutch the striking fork $n$ moves into frictional engagement with the collar thereby bringing to rest the spinning members of the gear box so that a quick and silent change of gear can be made. For this purpose the striking fork where it makes contact with the collar $m$ may be fitted with any suitable friction material $o$.

When the vehicle is standing and first gear is engaged the release of the clutch pedal first allows the movable clutch members $b$, $b^1$ to engage their complementary members $c$, $c^1$ under the influence of the springs. Immediately afterwards the main clutch becomes operative and the spinning member of the latter commences to rotate thus applying a torque to the cone clutch through the driving members $a$, $a^1$, the cam surfaces of which co-act with the cam surfaces on the movable clutch members to force the latter into closer engagement with their complementary members, the pressure increasing automatically with the transmitted torque and preventing any possibility of slip. The improved clutch therefore operates as a self-energizing double-cone clutch and has the important advantage over the present free-wheel transmission that when the vehicle is in motion and a lower gear is engaged the drive is taken up automatically through the double cone clutch and then through the main clutch so that the transmission is positively connected with the engine and the road wheels and hence the engine is available as a brake in descending steep hills. The improved clutch has the further advantage in that as compared with the free-wheel device it is relatively lightly loaded and free from the very high unit pressures which obtain in a free wheel.

In the inoperative position of the clutch shown in Figure 1 in which the clutch members abut against the fixed washer $r$ the clearance between the friction surfaces of the cones and rings is approximately .015″. On the clutch being engaged from rest by moving the sliding collar $m$ to the left the springs $d$ move the cones $b$, $b^1$ into frictional engagement with the rings in position to take up the drive from the driving members $a$, $a^1$ through the co-action between the cam faces $a^3$, $b^2$. The initial movement of the driving shaft causes the driving members $a$, $a^1$ to move back into contact with each other and in moving back they turn relatively to the cones about 6° and mount into the driving position on the cam surfaces $b^2$.

On the drive changing to overdrive that is to say, when the driven shaft becomes the driving shaft the friction surfaces of the cones and rings are maintained in contact with each other by the action of the springs the cam surfaces $b^2$ moving relatively to the cam surfaces $a^3$. This allows the driving members $a$, $a^1$ to move outwardly and to rotate the driven shaft with them and in so doing take 6° angular movement out of the rear axle assembly free movement.

When the driven shaft applies the over-drive load the cam surfaces $b^2$ move up the driving cam surfaces $a^3$, the cones having an angular movement relatively to the driving member of about 6°. In taking up the drive the driving members are forced close together against the action of the springs which cushion the take up.

On changing to a lower gear the disengagement of the main clutch first causes the striking fork $n$ to exert a braking effect on the collar $m$ thus bringing the driving shaft to rest. When the required change of gear has been made and the main clutch pedal released the cones $b$, $b^1$ come into contact with the rings $c$, $c^1$ at first under the pressure of the springs $d$ as the teeth $m^1$ on the sliding collar $m$, being in full engagement with the teeth $b^3$ prevent the cones from jumping into the self-energizing position. The engagement is thus smooth and progressive the two cones being connected together by the dowel ring $f$ and consequently both under the control of the sliding collar. When the load comes from the gear box end the clutch grips instantly without possibility of slip. Slip occurs through about 6° when picking up the load from the driven shaft but the moment the over-drive load comes on the clutch it grips instantly and without further slip. The conditions required for a clutch fitted behind the gear box are therefore fully met.

I claim:—

1. A self-energizing cone clutch of the class described comprising a driving shaft, a pair of driving members rotatable with and slidable thereon, springs arranged between said members and normally tending to force them apart, a pair of oppositely coned clutch members loosely mounted on said shaft one at each side of said driving members, the adjacent faces of said driving and clutch members having co-operating cam surfaces, a driven shaft, a pair of connected complementary clutch members rotatable with and slidable thereon, and means for disengaging the clutch and for allowing the same to become operative.

2. A self-energizing cone clutch of the class described comprising a driving shaft, an axially resilient driving member rotatable with and slidable thereon, a pair of oppositely coned clutch members loosely mounted on said shaft one at each side of said driving member, the adjacent faces of said clutch members and driving member being provided with co-operating cam surfaces, a driven shaft, a pair of complementary clutch members rotatable with and slidable thereon, a collar rotatable with and slidable on said driving shaft, the adjacent faces of said collar and one of the coned clutch members having co-operating radial teeth of V-section and means for moving said collar to disengage the clutch or to allow it to become operative.

ARTHUR BOLTON.